United States Patent Office 2,837,526
Patented June 3, 1958

2,837,526
2-ACETOXY-1,2-DIPHENYL-4-PIPERIDINO-PENTANE

Albert Pohland, Indianapolis, Ind., assignor to Eli Lilly and Company, Indianapolis, Ind., a corporation of Indiana No Drawing. Application April 14, 1954
Serial No. 423,234

4 Claims. (Cl. 260—294.3)

My invention relates to a novel base, 2-acetoxy-1,2-diphenyl-4-piperidinopentane, and to its therapeutically useful acid addition salts. This novel base can be represented by the following formula:

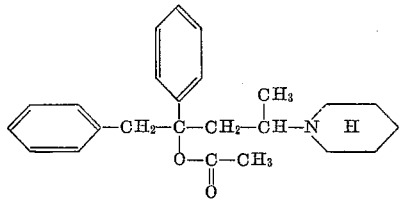

2-acetoxy-1,2-diphenyl-4-piperidinopentane, in itself, or as a relatively nontoxic acid addition salt thereof, is a useful analgesic of the codeine type. It is active orally, its action being marked by a lack of respiratory depression at analgetic doses.

The compound I have invented is conveniently prepared as follows: β-piperidinobutyrophenone, prepared by the method of Pohland and Sullivan—JACS 75, 4458 (1953), is reacted with a benzyl Grignard reagent to form 1,2-diphenyl-4-piperidinopentan-2-ol. The diphenyl piperidino-pentanol thus formed is then acetylated by reacting with acetic anhydride, yielding 2-acetoxy-1,2-diphenyl-4-piperidinopentane.

From the free base prepared as above, various acid addition salts can be made by reacting equivalent amounts of the desired acid with the base. I prefer to use those acids which will not markedly increase the toxicity of the free base, such as hydrochloric acid, sulfuric acid, maleic acid, succinic acid, phosphoric acid, and the like. Numerous other pharmaceutically useful acids which can be employed will readily be apparent.

My invention is further illustrated by the following specific examples.

Example 1

30.5 g. of β-piperidinobutyrophenone free base is prepared from its hydrochloride by dissolving the hydrochloride in water, adding an excess of concentrated ammonium hydroxide, extracting the thus-liberated free base into ether, drying the ether with anhydrous magnesium sulfate and filtering off the magnesium sulfate. The resulting solution of 30.5 g. of β-piperidinobutyrophenone in ether is then added to a Grignard reagent prepared from 31.0 g. of benzyl chloride and 13.9 g. of magnesium in 350 ml. of dry ether. The reaction mixture is refluxed for three hours after complete addition of the butyrophenone and is then allowed to stand overnight. An excess of a saturated solution of ammonium chloride is next added to decompose the Grignard complex, and the resulting water insoluble reaction product, 1,2-diphenyl-4-piperidinopentan-2-ol, is extracted into ether. The ethereal layer is separated, and dried over magnesium sulfate. The magnesium sulfate is removed by filtration, and dry gaseous hydrogen chloride is bubbled into the ethereal solution, causing precipitation of 1,2-diphenyl-4-piperidinopentan-2-ol hydrochloride. The precipitate is filtered off and recrystallized twice from a mixture of methanol and ethyl acetate. 1,2-diphenyl-4-piperidinopentan-2-ol hydrochloride melts at about 217–218° C.; yield=32 g.

5 g. of 1,2-diphenyl-4-piperidinopentan-2-ol hydrochloride is added to a mixture of 5 ml. of dry pyridine and 10 ml. of acetic anhydride. The mixture is refluxed for five hours, and ethyl acetate is then added to the point of incipient precipitation. Upon cooling the mixture, 2-acetoxy-1,2-diphenyl-4-piperidinopentane hydrochloride crystallizes. The crystals are filtered off and recrystallized twice from a mixture of methanol and ethyl acetate. The purified 2-acetoxy-1,2-diphenyl-4-piperidinopentane hydrochloride melts at about 223–225° C. The yield is 3.2 g.

Example 2

1 g. of 2-acetoxy-1,2-diphenyl-4-piperidinopentane hydrochloride is dissolved in water and a slight excess of ammonium hydroxide is added to the solution. 2-acetoxy-1,2-diphenyl-4-piperidinopentane, being insoluble in water, separates. It is quickly extracted into ether to avoid possible hydrolysis. The ethereal solution is separated and dried over magnesium sulfate, and the magnesium sulfate is removed by filtration. On evaporation of the ethereal filtrate in vacuo, a non-crystalline oily residue of 2-acetoxy-1,2-diphenyl-4-piperidinopentane remains.

Example 3

1 g. of 2-acetoxy-1,2-diphenyl-4-piperidinopentane is dissolved in ethanol, and added to a 1 percent aqueous sulfuric acid solution containing .077 cc. (.1414 g.) of 18 molar sulfuric acid. The solvent mixture is evaporated in vacuo leaving a solid residue of 2-acetoxy-1,2-diphenyl-4-piperidino sulfate. This solid residue is purified by recrystallization from a mixture of ethanol and ethyl acetate.

I claim:

1. A compound selected from the class consisting of 2-acetoxy-1,2-diphenyl-4-piperidinopentane, represented by the formula

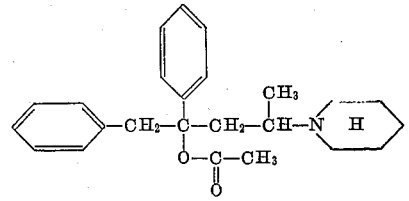

and its nontoxic acid addition salts.

2. 2-acetoxy-1,2-diphenyl-4-piperidinopentane, represented by the formula

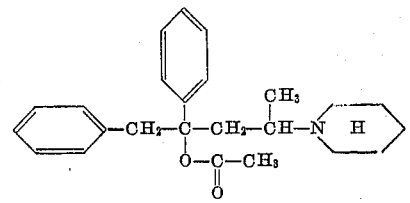

3. A salt of 2-acetoxy-1,2-diphenyl-4-piperidinopentane and a nontoxic acid.

4. 2-acetoxy-1,2-diphenyl-4-piperidinopentane hydrochloride.

References Cited in the file of this patent

UNITED STATES PATENTS

| | | |
|---|---|---|
| 2,374,525 | Cheney | Apr. 24, 1945 |
| 2,447,395 | Cheney | Aug. 17, 1948 |
| 2,480,224 | Cusic | Aug. 30, 1949 |
| 2,654,743 | Rhodehamel | Oct. 6, 1953 |
| 2,680,765 | Sprague | June 8, 1954 |

FOREIGN PATENTS

| | | |
|---|---|---|
| 265,665 | Switzerland | Apr. 1, 1950 |